US007675867B1

(12) United States Patent
Mraz et al.

(10) Patent No.: US 7,675,867 B1
(45) Date of Patent: Mar. 9, 2010

(54) ONE-WAY DATA TRANSFER SYSTEM WITH BUILT-IN DATA VERIFICATION MECHANISM

(75) Inventors: Ronald Mraz, South Salem, NY (US);
James Hope, Greenwich, CT (US);
Jeffrey Menoher, Norwalk, CT (US);
Dennis P. Mirante, Setauket, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 348 days.

(21) Appl. No.: 11/787,801

(22) Filed: Apr. 18, 2007

Related U.S. Application Data

(60) Provisional application No. 60/793,045, filed on Apr. 19, 2006.

(51) Int. Cl.
*H04L 12/28* (2006.01)
(52) U.S. Cl. ...................................... 370/254
(58) Field of Classification Search ........................ None
See application file for complete search history.

(56) References Cited

U.S. PATENT DOCUMENTS

| 5,282,200 | A | * | 1/1994 | Dempsey et al. ............ 370/245 |
| 5,703,562 | A | | 12/1997 | Nilsen |
| 6,108,787 | A | | 8/2000 | Anderson et al. |
| 6,415,329 | B1 | | 7/2002 | Gelman et al. |
| 6,477,578 | B1 | | 11/2002 | Mhoon |
| 6,665,268 | B1 | * | 12/2003 | Sato et al. .................... 370/242 |
| 7,095,739 | B2 | * | 8/2006 | Mamillapalli et al. ....... 370/390 |
| 7,246,156 | B2 | | 7/2007 | Ginter et al. |
| 7,260,833 | B1 | | 8/2007 | Schaeffer |
| 7,529,943 | B1 | * | 5/2009 | Beser .......................... 713/181 |
| 2002/0003640 | A1 | | 1/2002 | Trezza |

(Continued)

FOREIGN PATENT DOCUMENTS

WO    WO 8404435 A1 *  11/1984

(Continued)

OTHER PUBLICATIONS

M. Anderson, C. North, J. Griffin, R. Milner, J. Yesberg, K. Yiu, "Starlight: Interactive Link," 1996, Defence Science & Technology Organisation, Salisbury, South Australia, Australia.

(Continued)

*Primary Examiner*—Pankaj Kumar
*Assistant Examiner*—Gautam Sharma
(74) *Attorney, Agent, or Firm*—Amster Rothstein & Ebenstein LLP

(57) ABSTRACT

Embodiments of the present invention are directed to a one-way data transfer system with built-in data verification mechanism, comprising three nodes (Send Node, Receive Node, and Feedback Node) wherein (1) the three nodes are interconnected with each other by a one-way data link, and (2) the Feedback Node is designed solely for processing and relaying data verification information from the Receive Node to the Send Node. In these embodiments, the Send Node is capable of verifying the status of data it transferred to the Receive Node over a one-way data link without sacrificing the unidirectionality of data flow in the system and thereby compromising the level of security provided by use of one-way data links.

77 Claims, 7 Drawing Sheets

U.S. PATENT DOCUMENTS

| | | |
|---|---|---|
| 2002/0007453 A1 | 1/2002 | Nemovicher |
| 2002/0178271 A1 | 11/2002 | Graham et al. |
| 2003/0058810 A1 | 3/2003 | Petronic |
| 2003/0119568 A1 | 6/2003 | Menard |
| 2003/0229780 A1 | 12/2003 | Reamer |
| 2004/0103279 A1 | 5/2004 | Alten |
| 2004/0236874 A1 | 11/2004 | Largman et al. |
| 2005/0033990 A1 | 2/2005 | Harvey et al. |
| 2005/0149732 A1 | 7/2005 | Freeman et al. |
| 2005/0182937 A1 | 8/2005 | Bedi |
| 2005/0259587 A1* | 11/2005 | Wakumoto et al. .......... 370/248 |
| 2006/0153092 A1 | 7/2006 | Matityahu et al. |
| 2006/0209719 A1 | 9/2006 | Previdi et al. |

FOREIGN PATENT DOCUMENTS

| | | |
|---|---|---|
| WO | WO 2004/105297 A2 | 12/2004 |

OTHER PUBLICATIONS

"Interactive Link White Paper," Jul. 27, 2001, Tenix Defence Pty Ltd, Mawson Lakes, South Australia, Australia.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

* cited by examiner

ONE-WAY DATA TRANSFER SYSTEM WITH BUILT-IN DATA VERIFICATION MECHANISM

CROSS-REFERENCE TO RELATED APPLICATION

This U.S. non-provisional patent application claims priority from U.S. provisional patent application Ser. No. 60/793,045 filed on Apr. 19, 2006, the content of which is incorporated herein by reference in its entirety.

FIELD OF THE INVENTION

The present invention generally relates to the security of data networks. More particularly, the present invention relates to a one-way data transfer system with a built-in data verification mechanism.

BACKGROUND

Protection of a computer or data network from undesired and unauthorized data disclosure has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, the conventional network security devices such as firewalls may not provide sufficiently reliable protection from undesired data disclosure.

Alternative network security methods and devices have been devised to address the network security concern. For example, U.S. Pat. No. 5,703,562 to Nilsen ("the '562 patent"), the contents of which are hereby incorporated by reference in their entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links, including Dual Diode developed and marketed by Owl Computing Technologies, Inc., provide network security to data networks by isolating the networks from potential security breaches (i.e., undesired and unauthorized data flow out of the secure network) while still allowing them to import data from the external source in a controlled fashion. FIG. 1 schematically illustrates an example of one such Dual Diode one-way data transfer system. In the one-way data transfer system shown in FIG. 1, two computing platforms (or nodes) 1 and 2 (respectively, "the Send Node" and "the Receive Node") are connected to the unsecured external network 4 ("the source network") and the secure network 5 ("the destination network"), respectively. The Send Node is connected to the Receive Node by one-way data link 3, which may comprise, for example, a high-bandwidth optical fiber configured to operate as a unidirectional data gateway from the source network 4 to the secure destination network 5.

The one-way data transfer system described above may further comprise two specially configured Asynchronous Transfer Mode (ATM) network interface cards installed respectively in the Send Node and the Receive Node and respectively coupled to the ends of the high-bandwidth optical fiber. The interface card in the Send Node may be equipped only with components for phototransmission and the card in the Receive Node may be equipped only with components for photodetection, so that unidirectionality of data flow from the Send Node to the Receive Node across the optical fiber is physically enforced.

This configuration physically enforces one-way data transfer at both ends of the optical fiber connecting the Send Node to the Receive Node, thereby creating a truly unidirectional one-way data link between the source network 4 and the destination network 5 shown in FIG. 1. Unlike conventional firewalls, one-way data transfer systems such as Dual Diode based on a one-way data link are designed to transfer data or information only in one direction and it is physically impossible to transfer data or information of any kind in the reverse direction. No information or data of any kind, including handshaking protocols such as those used in TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

There exist other types of one-way data links that are capable of enforcing unidirectional data flow. For example, IP (Internet Protocol) architecture using standard firewalls or routers can be specially configured in various ways to enforce unidirectional data flow between two network domains or nodes. One example of such one-way data link is specially configured IP architecture that uses standard firewalls to enforce unidirectional flow of UDP (User Datagram Protocol) data packets between two network security domains corresponding to Send Node and Receive Node. In that configuration, a Receive Node may be protected by a standard firewall which is designed to accept only UDP data packets and deny all other service requests. Furthermore, a pair of additional firewalls that are joined back to back and positioned between the Send Node and the Receive Node may form a network guard capable of enforcing unidirectional flow of UDP data packets from the Send Node to the Receive Node. Preferably, this network guard is administered separately.

The unidirectionality of data flow in such configuration can be achieved as follows: The first firewall of the network guard which interfaces with the Send Node (which may also be protected by its own standard firewall) is designed to accept only UDP data packets from the Send Node and deny all other service requests from the Send Node. The second firewall of the network guard which interfaces with the firewall associated with the Receive Node is designed to deny all incoming service requests or data flow from the Receive Node. In this manner, the specially configured IP architecture based on standard firewalls may permit only unidirectional flow of UDP data packets from the Send Node to the Receive Node and denies any data flow from the Receive Node to the Send Node.

While a one-way data link provides excellent protection for data residing in the secure network as described above, its use raises a dilemma concerning data verification capability which is critical in any data transfer system: In a one-way data transfer system based on a one-way data link, the Send Node cannot verify from the Receive Node the status and integrity of the data it sent to the Receive Node without giving up the unidirectionality of data flow and thereby compromising the security provided by use of one-way data links.

The conventional implementation of data verification schemes requires a way for the Receive Node to communicate to the Send Node information regarding the status and integrity of the data received by the Receive Node from the Send Node. However, since a one-way data link allows only unidirectional communications from the Send Node to the Receive Node, a one-way data transfer system based solely on a one-way data link between the Send Node and the Receive Node cannot implement the data verification schemes without giving up the unidirectionality of data flow in the system. The present invention seeks to resolve this dilemma for one-way data transfer systems based on a one-way data link by providing them with built-in data verification mechanism without sacrificing the unidirectionality of data flow in the system.

The '562 patent addresses data verification for one-way data transfer systems based on a one-way data link by providing a "warning device" coupled to the secured computer that "emits" a "warning signal" when the secured computer detects error in data transmission over the one-way data link. As an example, the '562 patent suggests the use of "a single long duration tone" as the warning signal for error detection. (The '562 patent, Col. 4, lines 20-29, and FIG. 1.) However, while the '562 patent discloses that parity or checksum calculations or other conventional error detection calculations may be performed to detect any errors introduced during the repeated data transfer, it does not disclose or suggest any means for transmitting the result of such error detection calculations by the Receive Node to the Send Node so that the Send Node can compare the results and deduce the status and integrity of the transferred data from the comparison. Accordingly, the warning device as described in the '562 patent is not capable of maximally utilizing modern data verification schemes such as advanced hash algorithms. The present invention seeks to provide a one-way data transfer system with built-in data verification mechanism that is capable of maximally utilizing the power and benefits of the modem data verification schemes without compromising the level of security afforded by the use of one-way data links.

It is an object of the present invention to overcome the above described shortcomings in data verification mechanism for existing one-way data transfer systems based on a one-way data link.

It is another object of the present invention to provide a one-way data transfer system with built-in data verification mechanism without allowing any bilateral communications between nodes within the system.

It is yet another object of the present invention to provide a one-way data transfer system with built-in data verification mechanism wherein the nodes are interconnected with each other by a one-way data link.

It is yet another object of the present invention to provide a node that is designed specifically and solely for relaying data verification information from the Receive Node to the Send Node without compromising the level of security for the Receive Node.

It is yet another object of the present invention to provide a node that is designed solely to process and relay error detection calculations using modern data verification schemes.

It is yet another object of the present invention to provide a system of one-way data transfer sub-systems with built-in data verification mechanism comprising a plurality of Send Nodes and Receive Nodes interconnected by one-way data links.

Other objects and advantages of the present invention will become apparent from the following description.

SUMMARY OF THE INVENTION

It has now been found that the above and related objects of the present invention are obtained in the form of a one-way data transfer system with built-in data verification mechanism.

More particularly, the present invention relates to a one-way data transfer system comprising a send node, a receive node connected to the send node by a first one-way link for unidirectional transfer from the send node to the receive node, and a feedback node for generating data verification information based on data that the receive node received from the send node via the first one-way link, wherein the feedback node is connected to the receive node by a second one-way link for unidirectional transfer from the receive node to the feedback node, and is also connected to the send node by a third one-way link for unidirectional transfer from the feedback node to the send node.

The present invention is also directed to a one-way data transfer system comprising a plurality of nodes comprising at least one send node and at least one receive node, a feedback node for generating data verification information based on data that the receive node received from the send node, and a central switch for controlling routing of data from any of its inputs to any of its outputs, wherein each of the plurality of nodes and the feedback node is connected to a corresponding input of the central switch by a first one-way link for unidirectional transfer to the corresponding input and also connected to a corresponding output of the central switch by a second one-way link for unidirectional transfer from the corresponding output.

The present invention also relates to a method of verifying one-way data transfer from a send node to a receive node across a one-way link, comprising the steps of applying a data verification algorithm to data sent from the send node to the one-way link to generate a sent data verification information, applying the data verification algorithm to data received by the receive node from the one-way link to generate a received data verification information, sending the received data verification information to the send node over a feedback one-way link, and comparing the received data verification information with the sent data verification information to verify the status of the data that the receive node received from the send node via the one-way link.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE PREFERRED EMBODIMENTS

Figure 1:
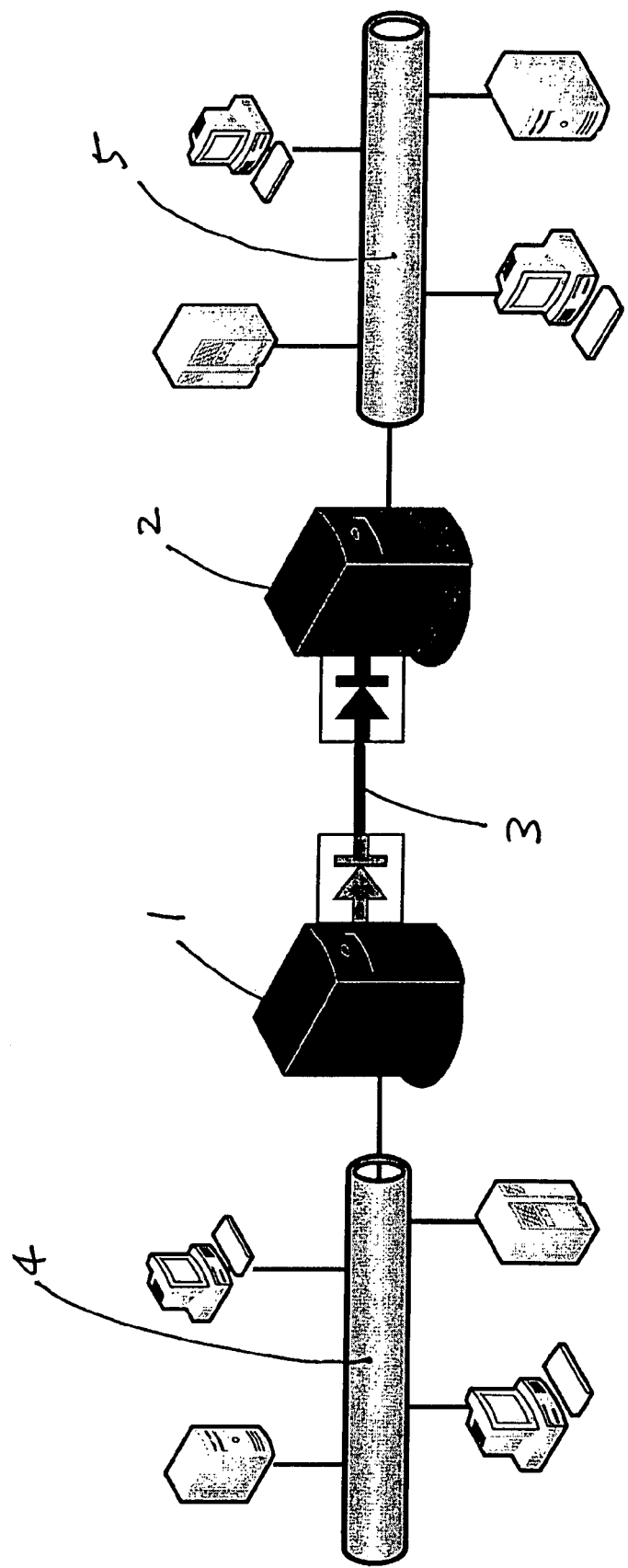
FIG. 1 schematically illustrates an example of a one-way data transfer system based on a one-way data link.
Figure 2:
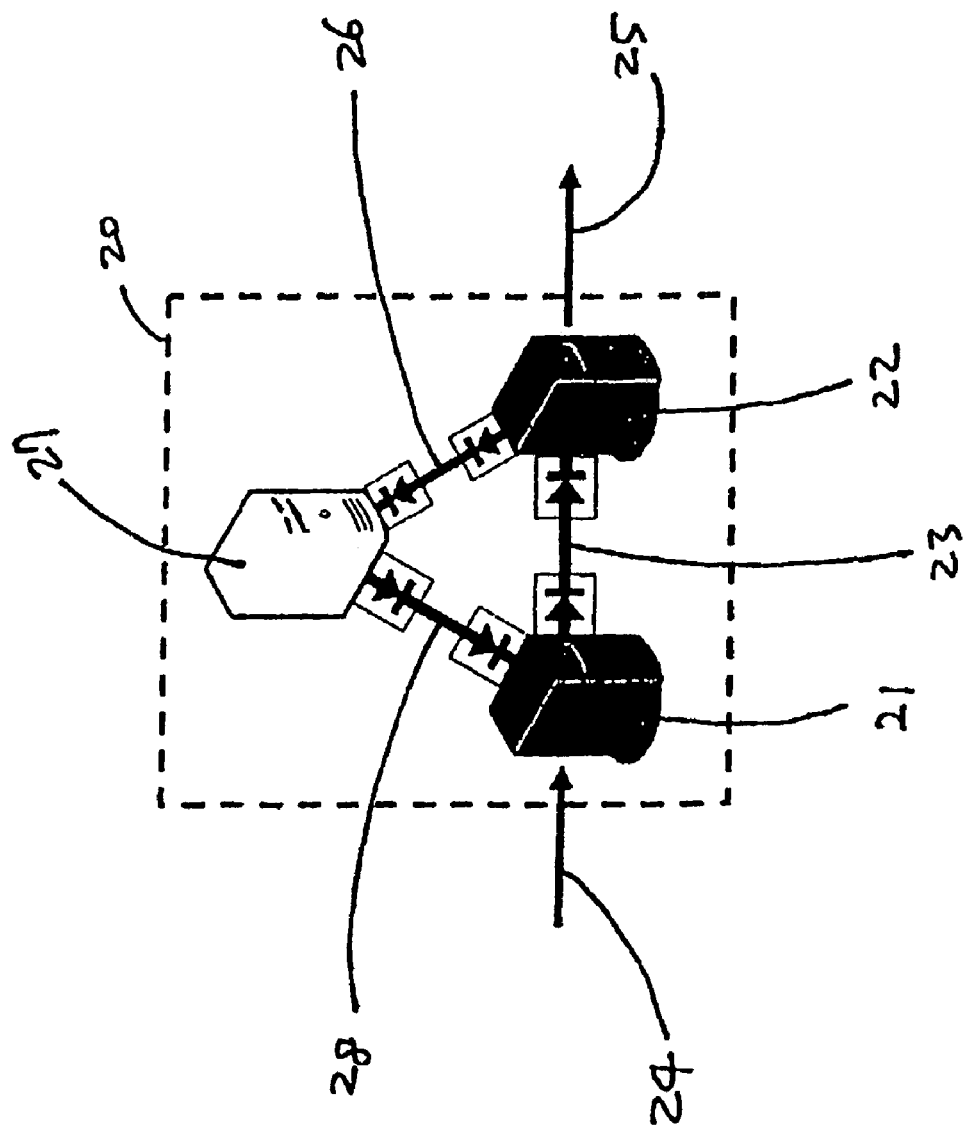
FIG. 2 is a schematic diagram of an embodiment of the present invention.

Illustrated in FIG. 2 is a schematic diagram of an embodiment of the present invention for a one-way data transfer system with built-in verification mechanism. The system 20 comprises a Send Node 21 coupled to the source network through a connection 24, a Receive Node 22 coupled to the destination network through a connection 25, and a Feedback Node 27. The Send Node 21 is connected to the Receive Node 22 by a one-way data link 23, the Receive Node 22 is connected to the Feedback Node 27 by a one-way data link 26, and the Feedback Node 27 is connected to the Send Node 21 by a one-way data link 28. As indicated by the arrow-bar symbols (only intended to symbolize the unidirectionality of data flow) in FIG. 2, the system 20 is designed to only allow unidirectional data flow from the Send Node to the Receive Node, from the Receive Node to the Feedback Node, and from the Feedback Node to the Send Node. It is noted that this embodiment of the present invention allows no direct bilateral communication between any two of the Nodes.

One-way data links 23, 26, 28 used in the embodiment of the present invention can be of any types of data transfer conduit that are capable of enforcing unidirectional data flow. For example, each of the one-way data links 23, 26, 28 may comprise high-bandwidth optical fiber whose both ends are respectively coupled to two specially configured ATM network interface cards for enforcing unidirectional optical data flow as described earlier in connection with the Dual Diode product. Alternatively, one-way data links used in the system 20 may comprise the specially configured IP architecture that use standard firewalls to enforce unidirectional transfer of, for example, UDP data packets, as described earlier. In addition, alternative embodiments of the present invention may use a combination of different types of one-way data link in the system 20.

In FIG. 2, the Send Node 21 and the Receive Node 22 provide the main data transfer conduit from the source network via connection 24 across the one-way data link 23 to the destination network via connection 25. Thus, these Nodes may comprise high-throughput computing platforms capable of carrying out the data transfer.

On the other hand, the third node in the system 20, Feedback Node 27, can be a special-purpose machine that is designed solely for processing and relaying data verification information from the Receive Node 25 to the Send Node 21, all via one-way data links 26 and 28. Accordingly, the Feedback Node 27 may comprise a minimum capacity machine incapable of transferring any data or information other than specifically designated data verification information from the Receive Node 22 to the Send Node 21.

In some embodiments of the present invention, the Feedback Node 27 may be designed to be user-configurable. In other words, it can be configured by the user to explicitly limit and adjust the channel capacity of the feedback channel through the Feedback Node 27, and thus limit the channel capacity of the only covert channel data path available in the one-way data transfer system. This capability for users to configure the security characteristics of the one-way data transfer system to match their security requirements can be a powerful feature. Whatever the settings for the channel capacity of the Feedback Node 27, it would be necessary to configure the Send Node 21 in a complementary manner to avoid timeout problems which may occur, for instance, when the Send Node 21 issues a feedback verification request.

The data verification information used in the system 20 may be generated by advanced hash algorithm. The hash algorithm is a type of the modern data verification schemes and widely-used hash algorithms include MD5 and the Secure Hash Algorithm (SHA) such as SHA-1. Before describing the possible use of hash algorithms in the system 20, further description of the application of hash algorithms in the context of bilateral communications and one-way data transfer between the Send Node and the Receive Node are in order.

One possible implementation of the data verification scheme using hash algorithm in the context of bilateral communications between the Receive Node and the Send Node can be described as follows: When transferring data packets to the Receive Node, the Send Node applies the hash algorithm to the contents of each data packet and calculates a corresponding "hash" number and transmits it to the Receive Node along with the data packets. Upon receipt of the data packets from the Send Node, the Receive Node also calculates the hash numbers corresponding to the received data packets and compares them with the hash numbers calculated by the Send Node. If the hash numbers calculated by both Nodes match, then there is no error in the data transfer. However, if the hash numbers do not match, then the Receive Node may drop the data packets it has received and log an error in the data transfer and communicates the error message to the Send Node. Typically, the error message comprises the hash number calculated by the Receive Node so that the Send Node can compare it with the hash number which the Send Node originally calculated and deduce the status and integrity of the transferred data from the result of the comparison.

Advanced hash algorithms may also be used to verify data integrity during one-way data transfer between the Send Node and the Receive Node in the following manner: A Send Node calculates a hash number corresponding to the contents of data or a data packet to be transferred to a Receive Node. The Send Node then transfers the hash number along with the data. Upon receipt of the data and the hash number from the Send Node, the Receive Node calculates on its own a hash number corresponding to the contents of the data or data packet it received. In each case, the hash algorithm generates a unique hash number corresponding to the data or data packet upon which the algorithm is applied. Accordingly, if the hash number calculated by the Receive Node matches with the hash number originally calculated by the Send Node, then there is no error in the data transfer from the Send Node to the Receive Node since the match indicates that the data received by the Receive Node is identical to the data sent by the Send Node. However, if these two hash numbers do not match, there must have been an error in the data transfer and accordingly, the Receive Node logs an error and may drop the data it received from the Send Node.

The data verification scheme based on advanced hash algorithms may be implemented in the embodiment of the present invention shown in FIG. 2 as follows: The Send Node 21 first calculates a hash number corresponding to the data to be transferred to the Receive Node 22 ("Hash Number 1"). The Send Node additionally calculates a hash number corresponding to the foregoing hash number ("Hash Number 2").

Upon receipt of the data across a one-way data link 23, the Receive Node 22 calculates a hash number corresponding to the data it received ("Hash Number 3"). The Receive Node 22 may also be designed to further receive Hash Number 1 calculated by the Send Node 21 based on the sent data and compare it with Hash Number 3. The matching of these two Hash Numbers indicates that there is no error in the one-way data transfer across the one-way data link 23. On the other hand, if these two Hash Numbers do not match, the Receive Node 22 becomes aware of the existence of an error in the one-way data transfer and may drop the data it received from the Send Node 21 and logs an error.

The Receive Node transmits Hash Number 3 to the Feedback Node 27 over a one-way data link 26. The Feedback Node 27 may be designed solely for processing hash numbers transmitted from the Receive Node 22 and then transmitting the results to the Send Node 21 over a one-way data link 28. For example, the Feedback Node 27 (in this example, it may be called the "Hash Feedback Node") may be designed solely for calculating a hash number corresponding to Hash Number 3 from the Receive Node 22 ("Hash Number 4") and transmit it to the Send Node 21.

Upon receipt of Hash Number 4 from the Feedback Node 27, the Send Node 21 compares Hash Number 4 with the Hash Number 2 it calculated prior to the data transfer to verify the status of the data it transferred to the Send Node 22. If Hash Number 2=Hash Number 4, the Send Node 21 deduces that the data received by the Receive Node 22 is identical to the data sent by the Send Node 21. On the other hand, if these Hash Numbers do not match, the Send Node 21 deduces that there must have been one or more errors in the data transfer across the one-way data link 23. In this manner, the Send Node 21 is capable of verifying the status of the data transferred to the Receive Node 22 with the help of the Feedback Node 27, without sacrificing the unidirectionality of data flow in the system 20 and the level of network security provided by it.

While the data verification scheme based on hash algorithm is used here to illustrate embodiments of the present invention, those skilled in the art will appreciate that the present invention does not depend on the choice of particular type of data verification scheme, and that the choice of data verification scheme will depend on the customer's needs such as the computer hardware/software requirements, the required level of sophistication for data verification, etc.

Figure 3:
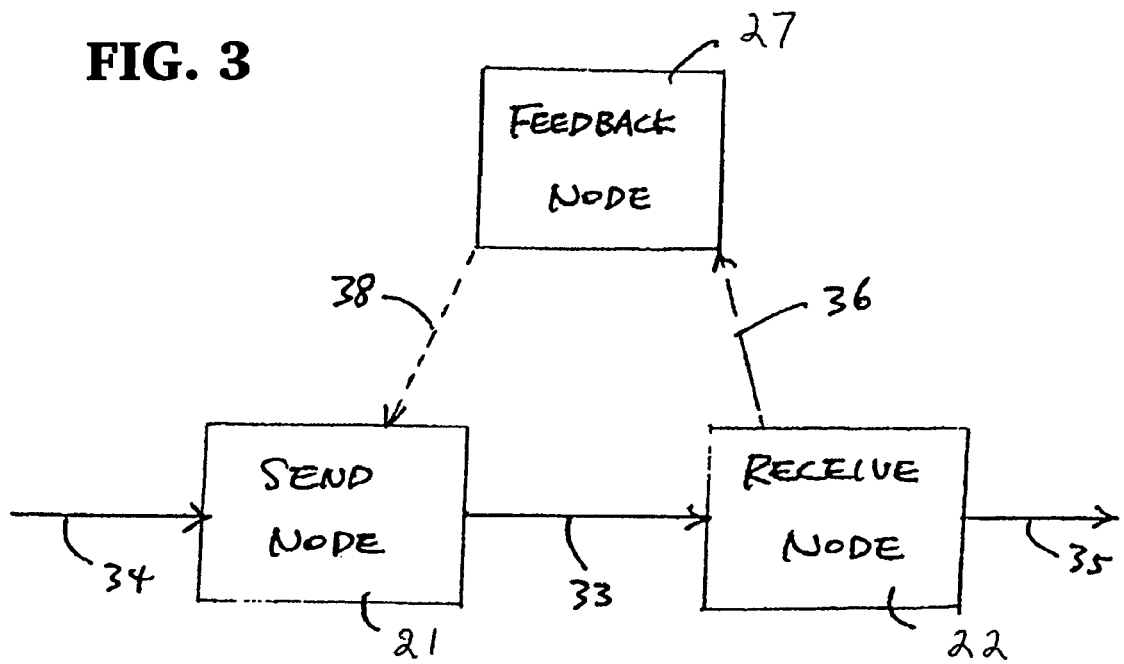
FIG. 3 is a functional block diagram for the embodiment of the present invention shown in FIG. 2 for unidirectional data flow from the Send Node to the Receive Node.
Figure 4:
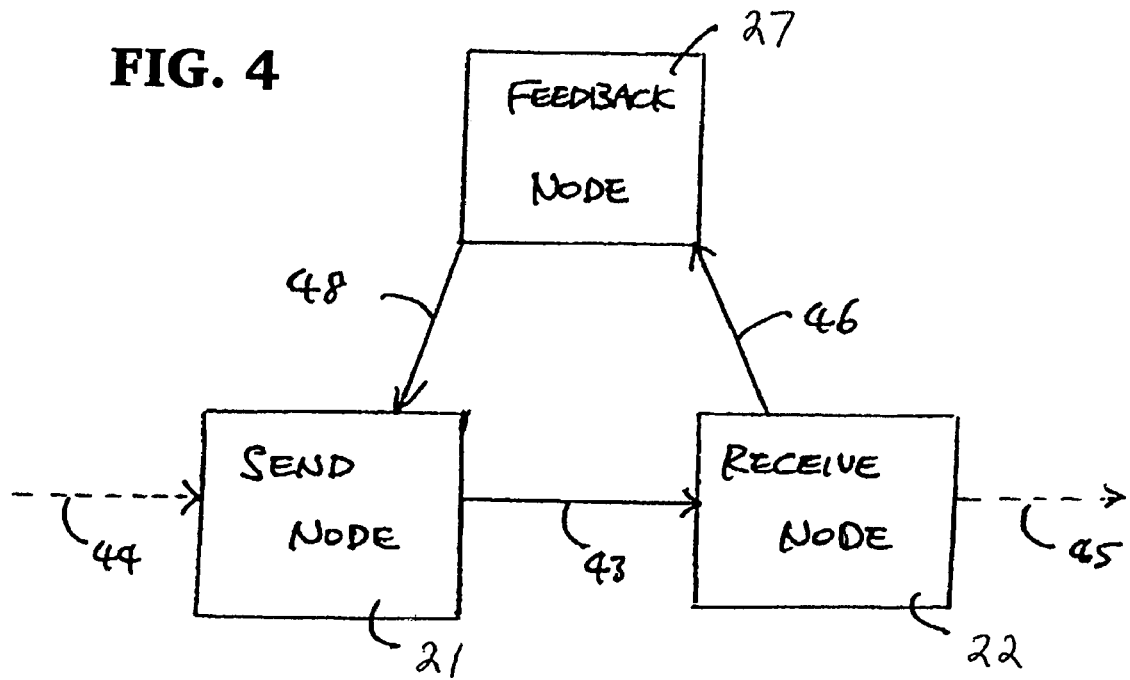
FIG. 4 is a functional block diagram for the embodiment of the present invention shown in FIG. 2 for unidirectional flow of data verification information from the Receive Node to the Feedback Node and from the Feedback Node to the Send Node.

Other possible implementations of the embodiment of the present invention shown in FIG. 2 are explained with the help of functional block diagrams shown in FIGS. 3 and 4. FIG. 3 is a functional block diagram for primary data flow for the embodiment of the present invention shown in FIG. 2. FIG. 3 shows the primary data flow from the source network through connection 34 to the Send Node 21 and to the Receive Node 22 across a one-way data link 33 and to the destination network through connection 35. During the primary data flow, the one-way data links 36 and 38 to and from the Feedback Node 27 may remain inactive.

During the primary data flow, the Send Node 21 may receive data in arbitrary form from the source network across connection 34. Send Node 21 may then encapsulate the data it receives (preferably in the order in which the data is received) for transfer to the Receive Node 22 across one-way data link 33. Encapsulated portions of data, which may be considered packets of proprietary structure, may be assigned with numbers for identification. These data packets may be grouped according to sessions, which are also assigned with identification numbers. The Send Node 21 may maintain a record of the packets it sent and the sessions to which they belong. The Send node 21 may also maintain a record of the status of its operational health. Such status may include presence or absence of errors in data transfer. The Receive Node 22 also maintains a record of the packets received and the sessions to which they belong. The Receive node 22 also maintains a record of the status of its operational health.

The data involved in the primary data flow may comprise one or more data packets or data files. Some examples of the types of data that may be involved in the primary data flow in FIG. 3 include: one or more files in the Send Node 21, UDP (User Datagram Protocol) packets received from the source network 24, TCP (Transmission Control Protocol) packets received and acknowledged by connection to the source network 24, and IP (Internet Protocol) packets received and acknowledged by connection to the source network 24. The data may also include header information or header bits containing information regarding the data such as file name, byte count, time stamp, and status bits. The status bits may comprise a limited number of pre-assigned status or error codes that may respectively indicate, for example, "no error," "file system full," "lost data packet," "unknown error," etc. The status bits may also contain non-error-related information, indicating, for example, "everything is okay, so the data transfer should be speeded up," or "everything is okay, but the data transfer should be speeded down since the node is really busy."

The Send Node 21 calculates and may store a hash number corresponding to the data to be transferred to the Receive Node 22, including the header information of the data. The Send Node 21 may be designed to further transmit this hash number to the Receive Node 22 along with the data. The Send Node 21 then further calculates and may store another hash number corresponding to the foregoing hash number (i.e., the data is "doubly hashed"). In addition, the Send Node 21 may have a table of all possible results from doubly hashing all possible status bits of the header information (i.e., hash numbers corresponding to all possible hash numbers, which in turn correspond to all possible status and error codes in the status bits for the data to be transferred).

FIG. 4 shows the feedback data flow for data verification purpose. The feedback data flow for data verification may be triggered automatically upon every instance of primary data flow across the one-way data link 33 shown in FIG. 3. Alternatively, the feedback data flow for data verification may be triggered by verification requests by the Send Node 21 to the Receive Node 22 over the one-way data link 43. The verification requests by the Send Node 21 may be designed to be made at predetermined periodic intervals. Furthermore, data verification may be done for one-way data transfer on a packet by packet basis, file by file basis, or according to any suitable desired schedule. During the feedback data flow for data verification, the connections 44 and 45 to the source network and the destination network may remain inactive.

Either before or after receiving the verification request from the Send Node 21 across the one-way data link 43, the Receive Node 22 calculates a hash number corresponding to the data it received from the Send Node 21 across the one-way data link 33. The Receive Node 22 may be designed to further compare this hash number with the hash number calculated by and received from the Send Node 21, which corresponds to the original data sent by the Send Node 21. Based on the comparison, the Receive Node 22 may determine the status of the received data and updates the status bits in the header information by setting up those bits corresponding to the appropriate status or error codes.

For example, if those two hash numbers match and therefore there is no error in the one-way data transfer across the one-way data link 33, then the Receive Node 22 sets the status code for "no error" to be non-zero (i.e., "1") and sets other error codes to be zero. If the two hash numbers do not match, then this non-match indicates that there may be one or more errors in the one-way data transfer across the one-way data link 33. Upon detecting the existence of one or more errors, the Receive Node 22 sets all the corresponding status and error bits to be non-zero. The status bits may be designed to indicate more than one error. If there are multiple errors in the one-way data transfer, then the multiple bits embedded in the status bits corresponding to all the applicable predefined error codes may be toggled to non-zero by the Receive Node 22.

The status bits may also be designed to indicate an error that is not directly related to the one-way data transfer. For example, if the data storage for the Receive Node 22 is full, then the Receive Node 22 will not be able to store and further process the data received from the Send Node 21 even if the received data does not contain any error or corruption. In this case, the Receive Node 22 may update the status bits to indicate a "disk full" or "file system full" error.

The Receive Node 22 may also calculate a hash number corresponding to this updated status and error bits. Upon encountering an error in the one-way data transfer, the Receive Node 22 may abort further processing of the data received from the Send Node 21, drop it, perform any necessary cleanup operations, and then wait for receipt of new data from the Send Node 21.

Upon receiving the verification request from the Send Node 21 across the one-way data link 43, the Receive Node 22 transmits the hash number corresponding to the received data across a one-way data link 46 to the Feedback Node 27. The Receive Node 22 may also transmit the hash number corresponding to the status and error bits it updated to the Feedback Node 27 across the one-way data link 46. The Feedback Node 27 is designed solely for processing hash numbers from the Receive Node 22 and transmitting the results to the Send Node 21. Accordingly, the only type of data transmitted from the Receive Node 22 to the Feedback Node 27 and from the Feedback Node 27 to the Send Node 21 is hash numbers such as MD5 or SHA-1 digests. The Feedback Node 27 then calculates hash number(s) corresponding to the hash number(s) received from the Receive Node 22 (i.e., doubly hashed status bits), and transmits the results to the Send Node 21 over a one-way data link 48.

Upon receipt of hash number(s) from the Feedback Node 27, the Send Node 21 may verify the status of the data sent to the Receive Node 22 across the one-way data link 33 by comparing the doubly hashed sent data it calculated and stored as described earlier with the doubly hashed received data from the Feedback Node 27. If those two hash numbers do not match, then the Send Node 21 may become aware of the existence of an error in the one-way data transfer to the Receive Node 22.

Additionally or alternatively, the Send Node 21 can also verify the status of the data transferred to the Receive Node 22 across the one-way data link 33 by comparing the value of the doubly hashed status bits from the Feedback Node 27 with the expected values known by the Send Node 21. As described earlier, the Send Node 21 may already know all possible expected values of doubly hashed status bits, based on which the Send Node 21 may generate and maintain a table of all the expected values. In this way, if an error has occurred, not only can the Send Node 21 detect the existence of an error in the one-way data transfer, but it can also identify the type of error in the one-way data transfer by identifying the error code in the status bits. However, if there is no match between the hash number from the Feedback Node 27 and any of the known expected values of the doubly hashed status bits, the Send Node 21 may determine that some unknown error must have occurred in the one-way data transfer to the Receive Node 22.

In an alternative embodiment, instead of knowing in advance all possible values of doubly hashed status bits, the Send Node 21 may examine and compare bit by bit the doubly hashed status bits from the Feedback Node 27 as follows: The Send Node 21 turns on (i.e., sets to be non-zero) the leftmost bit in the status bits field in the header information, calculates its expected doubly hashed value, and compares it to the value of the doubly hashed status bits received from the Feedback Node 27. If both hash numbers match, then the error that occurred corresponds to the single bit that is turned on in the status bits. If these two hash numbers do not match, then the error bit is rotated right to the next bit position of the status bits field and the double hash number calculations and comparisons are repeated until either a match occurs, or all defined positions in the status bits have been examined and exhausted. If all bit positions corresponding to errors have been rotated through without any match between the hash number calculated by the Send Node 21 and the hash number received from the Feedback Node 27, then some unknown error has occurred and the one-way data transfer process may be terminated by the Send Node 21.

Figure 5:
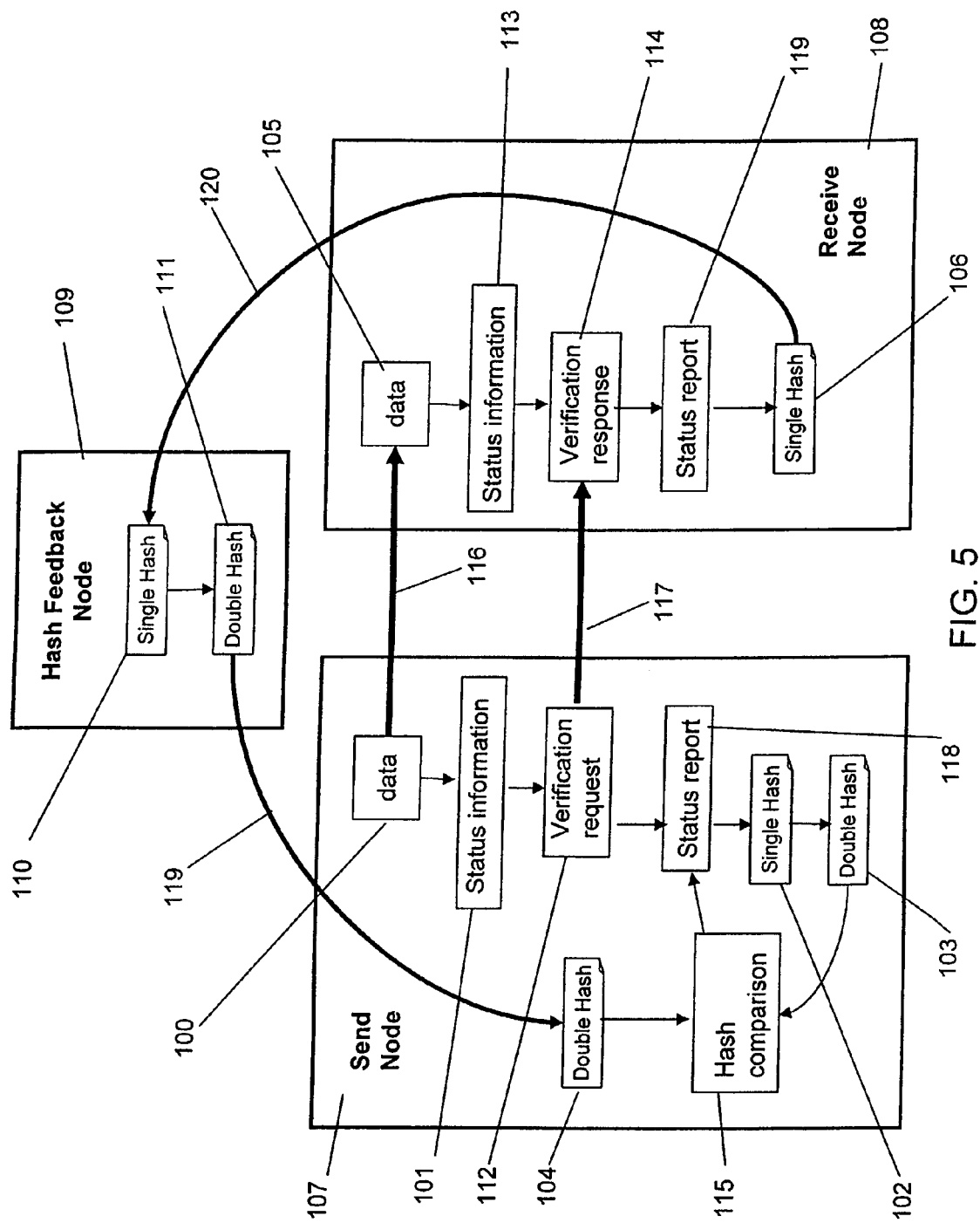
FIG. 5 is another functional block diagram containing flow charts for the embodiment of the present invention shown in FIG. 2.

The functional diagram in FIG. 5 uses flow charts to describe another way in which the embodiment of the present invention shown in FIG. 2 may be implemented. As shown in FIG. 5, the Send Node 107 transfers data 100 with its existing headers and check bits to the Receive Node 108 via a one-way link 116. The Send Node 107 maintains status information 101. In addition to carrying ubiquitous information, data 100 may also indicate Start of Message (SOM) or End of Message (EOM). The status information 101 may include a running digest of previously accumulated hash information, current packet number, session number, or other information.

The Receive Node 108 receives data 105 from the Send Node 107 which may or may not contain errors introduced during the one-way transfer. The received data 105 may or may not be identical to the sent data 100. The Receive Node 108 also determines its own status and maintains status information 113.

At some predefined time interval, or at any time when deemed necessary, the Send Node 107 initiates a verification request process 112. During the verification request process, the sent data 100, which may contain an SOM or an EOM indicator or any other information, is designated as a Feedback Verification Request Message 117 and sent to the Receive Node 108. The Feedback Verification Request Message 117 may be structurally identical to the previously sent data-bearing message 116, and may be identified by a single toggled bit in the data header.

Upon receipt of the Feedback Verification Request Message 117, the Receive Node 108 initiates a verification response process 114. The verification response process in the Receive Node 108 uses the status information 113 determined and maintained by the Receive Node 108 and the status information embedded in the Feedback Verification Request Message 117 from the Send Node 107 to render its own status report 119. The status information embedded in the Feedback Verification Request Message 117 may include information relating to time stamp, packet number and session number, and may contain some portion of the status information 101 generated by the Send Node 107. Alternatively, the status information embedded in the Feedback Verification Request Message 117 may be identical to the status information 101 generated by the Send Node 107.

The status report 119 in the Receive Node 108 may contain up to 64 individual binary status indicators which may be used singly or concurrently, and includes the communication status on Receive Node 108 and known data items. The status report 119 may include time stamp information which can be used to perform data throughput calculation in real time. Such calculations may be used to measure the operational health of the overall system, including detection of instances of "operating system interference." The Receive Node 108 uses status report 119 to create a hash number 106. The hash number 106 may be generated by a single 16 byte MD5 hash calculation. The Receive Node 108 then passes the hash number 106 to the Hash Feedback Node 109 via a one-way data link 120.

Upon receipt of the hash number 110 (also labeled hash number 106 in the Receive Node 108) via the one-way data link 120 from the Receive Node 108, the Hash Feedback Node 109 rehashes the hash number 110 to create double hash number 111. The Hash Feedback Node 109 then sends this double hash number 111 to the Send Node 107 via a one-way data link 119.

Upon receipt of the double hash number 104 (also labeled double hash number 111 in the Hash Feedback Node 109) via the one-way data link 119 from the Hash Feedback Node 109, the Send Node 107 initiates a hash comparison 115. During the hash comparison 115, the Send Node 107 renders the status information 101 retained in the Send Node 107 into a status report 118. The status report 118 may contain up to 64 individual binary status indicators which may be used singly or concurrently. Like the status report 119 in the Receive Node 108, the status report 118 may include time stamp information which can be used to perform data throughput calculation in real time. Such calculations may be used to measure the operational health of the overall system, including detection of instances of "operating system interference."

The Send Node 107 uses the status report 118 to create a hash number 102, which is hashed again in the Send Node 107 to generate a double hash number 103. The hash number 102 may be generated by a single 16 byte MD5 hash calculation. Likewise, the double hash number 103 may be the result of the same 16 byte MD5 hash calculation applied to the hash number 102. The hash comparison 115 compares the two double hash numbers 104 and 103. When these two double hash numbers 104 and 103 match, the state is known (i.e., no error in the one-way data transfer 116). If they do not match, the following loop algorithm may be employed.

The Send Node 107 recalculates the status report 118, hash number 102, and double hash number 103 by running through a sequence of known hypothetical errors in data transfer, comparing each new recalculated value of double hash number 103 with the hash number 104 received from the Hash Feedback Node 109 until a match is found, or until all known error conditions are exhausted. A looping algorithm used here may be designed to create the status request for the most commonly encountered states first, typically starting with the no-error state. The hash comparison 115 checks for all known possible status conditions including absence of errors, known errors, unknown errors, and other known possible states. Exhaustion of all known error states without a match between the double hash numbers 103 and 104 may indicate some unknown fundamental breakdown in the one-way data transfer system and may raise an alarm.

In addition, if the Send Node 107 initiates a verification request process 112 but fails to receive a double hash response 104 from the Hash Feedback Node 109 within a user-configurable time interval, the feedback verification process may be designed to time out and raise an alarm. As described earlier, the Hash Feedback Node 109 may be configured to have a limited communication channel capacity, and therefore may be configured to only operate for short predefined time intervals (e.g., one-second intervals) to mitigate the possible threat of a reverse-direction covert channel. In that case, the timeout configuration of the Send Node 107 is necessarily tuned to the channel capacity limits of Hash Feedback Node 109.

In some embodiments of the present invention, the timing of the processes described above and in FIG. 5 may be randomized to prevent potential risk of covert channel being created through the Hash Feedback Node 109 by, for example, time-series modulation of the messages through the Node 109. This randomization can be achieved by introducing arbitrary time delay in any or all of the processes involved in the data verification shown in FIG. 5. For example, instead of predefined periodic time intervals, the Send Node 107 may initiate the verification request process 112 and send the Feedback Verification Request Message 117 to the Receive Node 108 at random time intervals.

As shown in the foregoing descriptions, the embodiments of the present invention may allow data verifications by the Send Node 21 for the data it transfers to the Receive Node 22 across a one-way data link 33 without giving up the unidirectionality of data flow in the system 20 and thereby compromising the level of security provided by the use of one-way data links.

Figure 6:
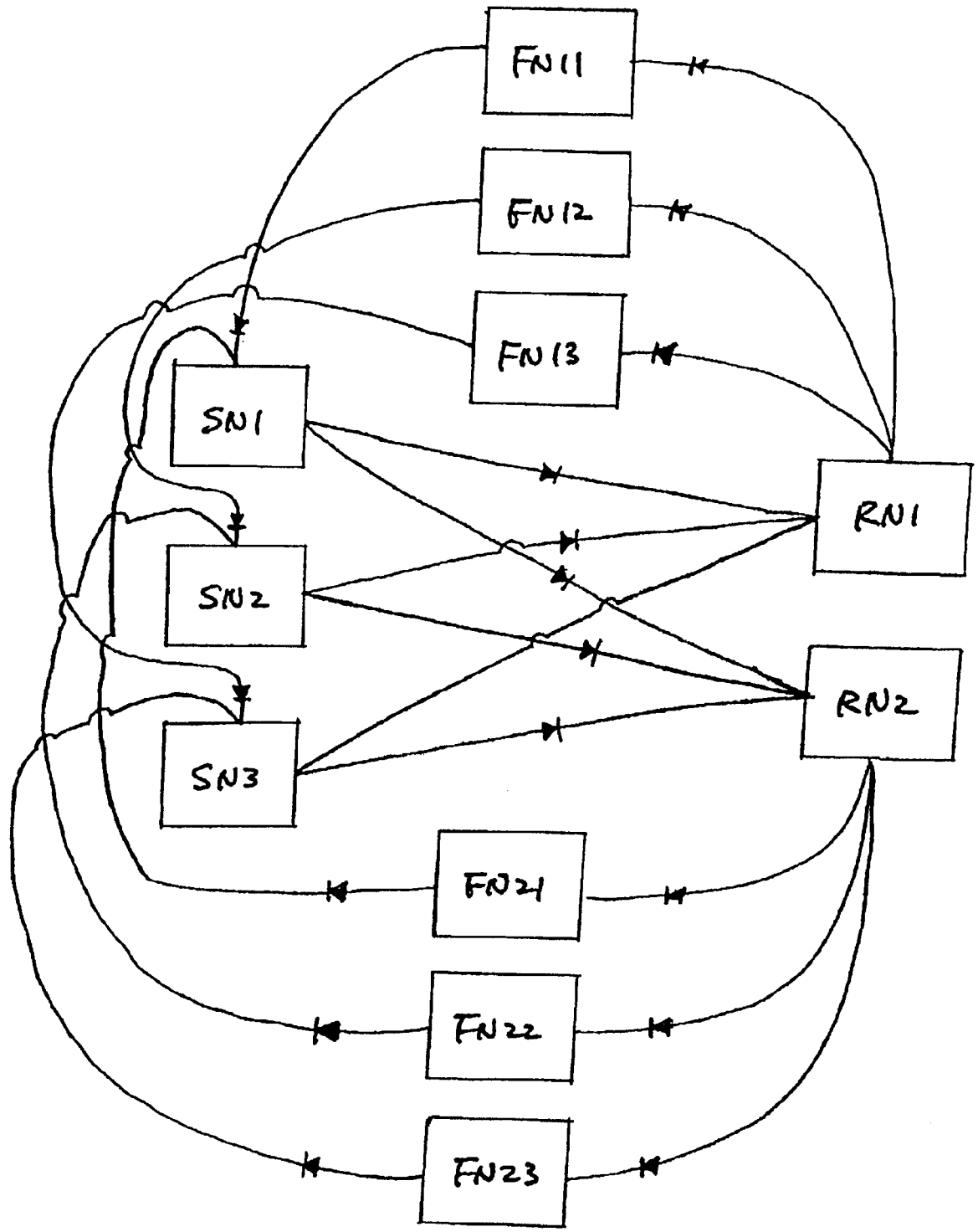
FIG. 6 is a schematic diagram showing an example of an alternative embodiment of the present invention for a plurality of Send Nodes and Receive Nodes.

FIG. 6 schematically shows another embodiment of the present invention that accommodates a plurality of Send Nodes and Receive Nodes. The present invention may accommodate any number of Send Nodes and any number of Receive Nodes and the number of Send Nodes may not necessarily equal to the number of Receive Nodes.

FIG. 6 illustrates an example of an embodiment of the present invention accommodating three Send Nodes (SN1, SN2, SN3) and two Receive Nodes (RN1, RN2), requiring six Feedback Nodes (FN11, FN12, FN13, FN21, FN22, FN23) for data verification for one-way data transfer from any one of the three Send Nodes to any one of the two Receive Nodes. In this configuration, SNi, RNj, and FNji (wherein i=1, 2, or 3; and j=1, or 2) form a sub-system for one-way data transfer from SNi to RNj with built-in data verification through FNji. Each sub-system may operate as shown and described above in connection with FIGS. 2, 3, and 4.

Although this embodiment is effective for configurations involving relatively few nodes, as shown in FIG. 6, it is noted that even with only three Send Nodes and two Receive Nodes, the network of one-way data links (in this example, 18 one-way data links) interconnecting the Nodes already becomes very complicated. Furthermore, six Feedback Nodes are required to accommodate data verification for one-way data transfer between any arbitrary Send Node and Receive Node. For N number of Send Nodes and M number of Receive Nodes, the embodiment shown in FIG. 6 would require N×M number of Feedback Nodes as well as 3×N×M number of one-way data links interconnecting the Nodes. Accordingly, one can easily see that as the number of Send Nodes and Receive Nodes increases in a system, the number of required Feedback Nodes and the complexity of one-way data link network interconnecting the Nodes escalate dramatically (in mathematical term, geometrically).

Figure 7:
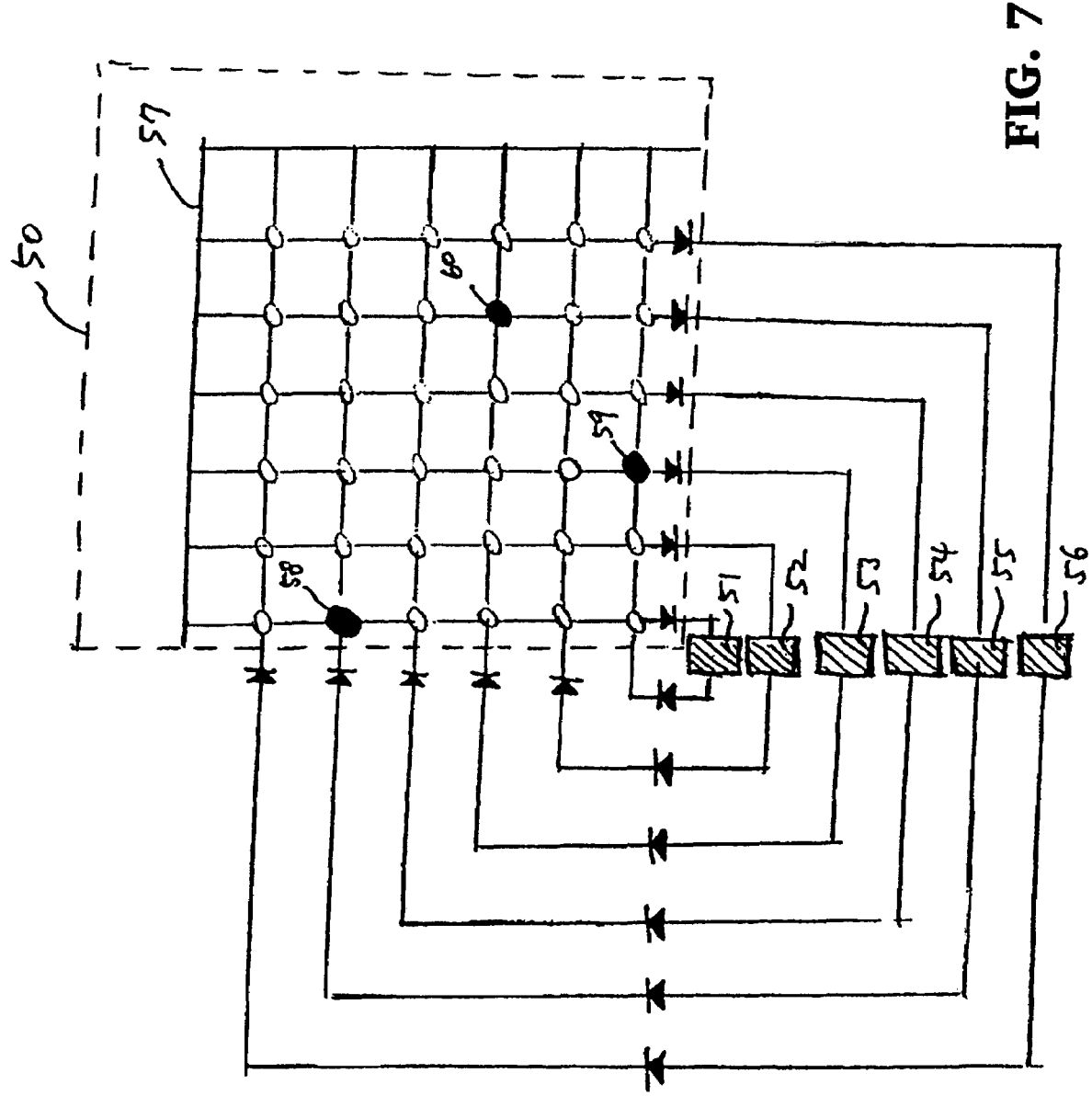
FIG. 7 is a schematic diagram showing an example of another alternative embodiment of the present invention for a plurality of Send Nodes and Receive Nodes.

FIG. 7 is a schematic diagram of an alternative embodiment of the present invention that seeks to overcome this complexity attendant with a network involving a large number of Send Nodes and Receive Nodes by use of a central switch 50 interconnecting all Nodes. FIG. 7 shows an example of the alternative embodiment of the present invention accommodating three Send Nodes 54, 55, 56 and two Send Nodes 51 and 52. A single Feedback Node 53 is present in this configuration. One of the advantages of using this embodiment of the present invention is that by use of a central switch 50, only a single Feedback Node 53 (compared to six Feedback Nodes in the FIG. 6 embodiment) is necessary to accommodate data verification for one-way data transfer between any one of three Send Nodes and any one of two Receive Nodes. All of the Nodes 51-56 are connected to both "input" and "output" sides of the central switch 50 by one-way data links, requiring 12 one-way data links (compared to 18 one-way data links in the FIG. 6 embodiment). In addition, all of the Send Nodes 51, 52, the Receive Nodes 54, 55, 56, and the Feedback Node 53 in FIG. 7 may operate as those shown and described in connection with FIGS. 2, 3 and 4. The central switch 50 is designed to route the data from any one of the Send Nodes coupled to its input sides to any one of the Receive Nodes coupled to its output side and also from the Receive Node to the Feedback Node and then from the Feedback Node to the Send Node.

The central switch 50 shown in FIG. 7 may comprise a commercially available ATM switch, and may be controlled by an ATM switch operator domain 57. The ATM switch operator domain 57 is preferably highest level security domain to prevent any improper and unauthorized routing of data, and may be operated manually by an ATM switch administrator, or by software, or by any other suitable secure control means known in the field.

Figure 8A:
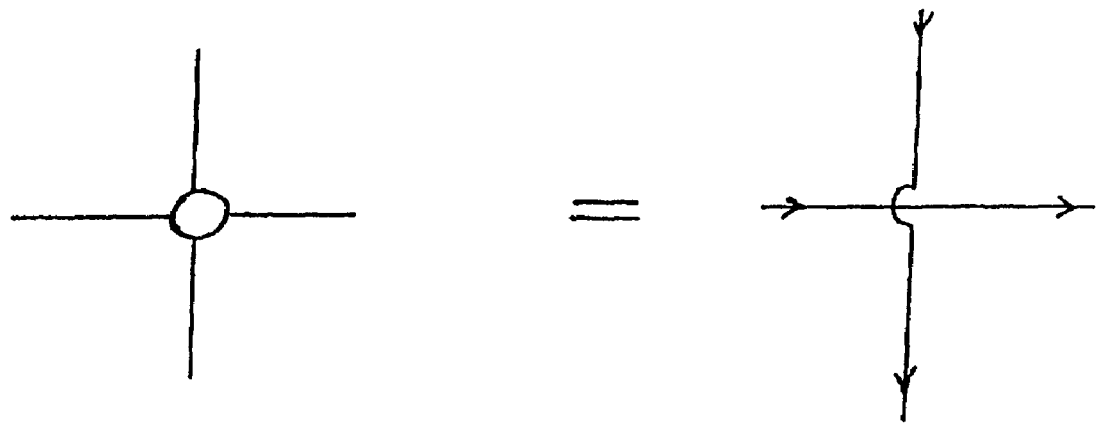
FIGS. 8A and 8B respectively illustrate "OFF" and "ON" states at a junction of a central switch used in the embodiment of the present invention shown in FIG. 7.
Figure 8B:
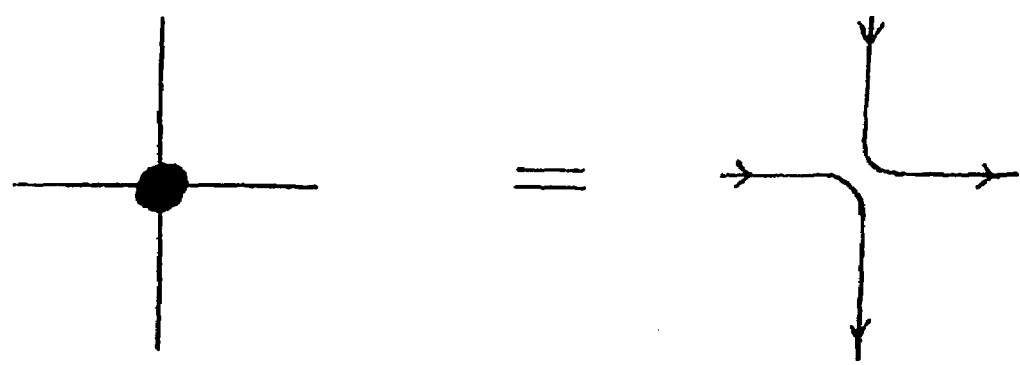

The central switch 50 may be based on crossbar switch logic. In FIG. 7, the crossbar switch logic is represented by 6×6 matrix of horizontal and vertical lines joined at each junction by either an open circle or a darkened circle. As shown in FIG. 8A, the open circle represents a switch junction configuration ("OFF") where data or signal traveling on the horizontal line from the left will continue to travel horizontally to the right, while data or signal traveling from the top on the vertical line will continue to travel downward on the vertical line. As shown in FIG. 8B, the darkened circle represents a switch junction configuration ("ON") where data or signal traveling from the left on the horizontal line is switched to the vertical line to travel downward, while data or signal traveling from the top on the vertical line is switched to the horizontal line to travel to the right.

As an example, the configuration of the central switch 50 shown in FIG. 7 illustrates how the central switch 50 operates to implement this embodiment of the present invention when the Send Node 55 conducts one-way data transfer to the Receive Node 51. By turning ON the switch junction 58, the central switch 50 allows one-way data transfer over a one-way data link from the Send Node 55 to the Receive Node 51. By turning ON the switch junction 59, the central switch 50 then allows the Receive Node 51 to transmit over a one-way data link data verification information such as hash number, MD5 digest, etc. to the Feedback Node 53. By turning ON the switch junction 60, the central switch 50 then routes the data verification information processed by the Feedback Node 53 (such as doubly hashed status bits, MD5 digest of the MD5 digest from the Receive Node 51, etc.) to the Send Node 55 over a one-way data link. In this manner, one-way data transfer from the Send Node 55 to the Receive Node 51 can be achieved and the Send Node 55 can verify the status of the transferred data by examining the data verification information from the Receive Node 51 which is processed and relayed by the Feedback Node 53.

As illustrated in the foregoing example, with proper configuration of switch junctions of the central switch 50 (i.e., by turning ON and OFF the appropriate switch junctions), one-way data transfer from any one of the Send Nodes 54, 55, 56 to any one of the Receive Nodes 51, 52 and data verification from that Receive Node to that Send Node through the Feedback Node 53 can be achieved.

The matrix of the central switch 50 shown in FIG. 7 may be expanded indefinitely to accommodate any arbitrary number of Send Nodes and Receive Nodes without introducing much complexity to the one-way data link network compared to the embodiment shown in FIG. 6. Furthermore, it is significant to note that only one Feedback Node is necessary to accommodate any arbitrary number of Send Nodes and Receive Nodes in this embodiment of the present invention illustrated in FIG. 7.

For N number of Send Nodes and M number of Receive Nodes, the FIG. 7 embodiment would require a central switch with (N+M+1)×(N+M+1) matrix, only a single Feedback Node, and 2×(N+M+1) number of one-way data links connecting the Nodes to the input and output sides of the central switch. As a comparison, the FIG. 6 embodiment would require in the same situation N×M number of Feedback Nodes and 3×N×M number of one-way data links to properly connect the Nodes. Accordingly, compared to the embodiment shown in FIG. 6, the embodiment shown in FIG. 7 using a central switch 50 has much less complexity and requires much smaller number of components (i.e., smaller cost for building a system implementing the present invention).

It is to be understood that while certain forms of the present invention have been illustrated and described herein, it is not to be limited to the specific forms or arrangement of parts described and shown. The present embodiments are therefore to be considered in all respects as illustrative and not restrictive. Accordingly, the spirit and scope of the present invention is to be construed broadly.

What is claimed is:

1. A one-way data transfer system comprising:
    a send node;
    a receive node connected to the send node by a first one-way link for unidirectional transfer from the send node to the receive node; and
    a dedicated feedback node for generating data verification information based on data that the receive node received from the send node via the first one-way link,
    wherein the dedicated feedback node is connected to the receive node by a second one-way link for unidirectional transfer from the receive node to the dedicated feedback node, and is also connected to the send node by a third one-way link for unidirectional transfer from the dedicated feedback node to the send node,
    wherein the dedicated feedback node does not transfer message data back to the send node.

2. The one-way data transfer system of claim 1, wherein the dedicated feedback node comprises a minimum capacity machine for transferring only the data verification information and no other data to the send node.

3. The one-way data transfer system of claim 1, wherein the communication channel capacity of the dedicated feedback node is user-configurable.

4. The one-way data transfer system of claim 1, wherein the dedicated feedback node is configurable to operate only for predefined time intervals.

5. The one-way data transfer system of claim 1, wherein the send node comprises a processor for generating a data verification request to be sent to the receive node over the first one-way link.

6. The one-way data transfer system of claim 5, wherein the data verification information is generated only after the data verification request is received by the receive node.

7. The one-way data transfer system of claim 5, wherein the data verification request is generated at a predefined time interval.

8. The one-way data transfer system of claim 5, wherein the data verification request is generated at a periodic time interval.

9. The one-way data transfer system of claim 5, wherein the data verification request is generated at a random time interval.

10. The one-way data transfer system of claim 1, wherein the data verification information comprises a hash number.

11. The one-way data transfer system of claim 10, wherein the hash number is an MD5 digest or a SHA-1 digest.

12. The one-way data transfer system of claim 1, wherein
the send node comprises a processor for applying a hash algorithm to data that the send node sends to the receive node via the first one-way link to generate a first hash number; and
the receive node comprises a processor for applying the hash algorithm to the data that the receive node receives from the send node via the first one-way link to generate a second hash number.

13. The one-way data transfer system of claim 12, wherein the dedicated feedback node comprises a processor for generating the data verification information based on the second hash number received from the receive node via the second one-way link.

14. The one-way data transfer system of claim 13, wherein the send node further comprises a processor for comparing the first hash number with the data verification information received from the dedicated feedback node via the third one-way link to verify the status of the data that the receive node received from the send node via the first one-way link.

15. The one-way data transfer system of claim 12, wherein the receive node further comprises a processor for comparing the second hash number with the first hash number received from the send node.

16. The one-way data transfer system of claim 15, wherein the receive node further comprises a processor for logging an error if the second hash number does not match the first hash number.

17. The one-way data transfer system of claim 15, wherein the receive node is designed to drop the data received from the send node via the first one-way link if the second hash number does not match the first hash number.

18. The one-way data transfer system of claim 12, wherein the dedicated feedback node comprises a processor for applying the hash algorithm to the second hash number received from the receive node to generate the data verification information.

19. The one-way data transfer system of claim 18, wherein the send node further comprises
a processor for applying the hash algorithm to the first hash number to generate a first double hash number; and
a processor for comparing the first double hash number with the data verification information received from the dedicated feedback node via the third one-way link to verify the status of the data that the receive node received from the send node via the first one-way link.

20. The one-way data transfer system of claim 19, wherein the send node further comprises
a processor for calculating expected double hash numbers from known hypothetical error scenarios; and
a processor for comparing the expected double hash numbers with the data verification information to identify an error in the data that the receive node received from the send node via the first one-way link, if the data verification information does not match the first double hash number.

21. The one-way data transfer system of claim 19, wherein the send node further comprises
a table of expected double hash numbers from known hypothetical error scenarios; and
a processor for comparing the expected double hash numbers with the data verification information to identify an error in the data that the receive node received from the send node via the first one-way link, if the data verification information does not match the first double hash number.

22. The one-way data transfer system of claim 1, wherein
the send node comprises a processor for determining status information of data that the send node sends to the receive node via the first one-way link; and
the receive node comprises a processor for determining status information of the data that the receive node receives from the send node via the first one-way link.

23. The one-way data transfer system of claim 22, wherein the receive node further comprises a processor for applying a hash algorithm to the status information of the received data to generate a received data status hash number.

24. The one-way data transfer system of claim 23, wherein the dedicated feedback node comprises a processor for applying the hash algorithm to the received data status hash number received from the receive node via the second one-way link to generate the data verification information.

25. The one-way data transfer system of claim 24, wherein the send node further comprises:
a processor for applying the hash algorithm to the status information of the sent data to generate a sent data status hash number;
a processor for applying the hash algorithm to the sent data status hash number to generate a sent data status double hash number; and
a processor for comparing the sent data status double hash number with the data verification information received from the dedicated feedback node via the third one-way link to verify the status of the data that the receive node received from the send node via the first one-way link.

26. The one-way data transfer system of claim 25, wherein the send node further comprises
a processor for calculating expected double hash numbers from known hypothetical error scenarios; and
a processor for comparing the expected double hash numbers with the data verification information to identify an error in the data that the receive node received from the send node via the first one-way link, if the data verification information does not match the sent data status double hash number.

27. The one-way data transfer system of claim 25, wherein the send node further comprises
a table of expected double hash numbers from known hypothetical error scenarios; and
a processor for comparing the expected double hash numbers with the data verification information to identify an error in the data that the receive node received from the send node via the first one-way link, if the data verification information does not match the sent data status double hash number.

28. A one-way data transfer system comprising:
a plurality of nodes comprising at least one send node and at least one receive node;
a dedicated feedback node for generating data verification information based on data that one of the at least one receive node received from one of the at least one send node; and
a central switch for controlling routing of data from any one of its inputs to any one of its outputs,
wherein each of the plurality of nodes and the dedicated feedback node is connected to a corresponding one of the inputs of the central switch by a first one-way link for unidirectional transfer to the corresponding input and also connected to a corresponding one of the outputs of the central switch by a second one-way link for unidirectional transfer from the corresponding output,
wherein the dedicated feedback node does not transfer message data back to the send node.

29. The one-way data transfer system of claim 28, wherein the central switch is based on crossbar switch logic.

30. The one-way data transfer system of claim 28, wherein the central switch comprises a matrix of switch junctions for interconnecting the inputs and the outputs, wherein each of the switch junctions controls routing from one of the inputs to the corresponding output of the central switch.

31. The one-way data transfer system of claim 28, wherein the central switch comprises an ATM switch.

32. The one-way data transfer system of claim 31, wherein the central switch further comprises an ATM switch operator domain to control the ATM switch.

33. The one-way data transfer system of claim 28, wherein the number of the inputs of the central switch is at least the number of the plurality of nodes and the dedicated feedback node.

34. The one-way data transfer system of claim 28, wherein the number of the outputs of the central switch is at least the number of the plurality of nodes and the dedicated feedback node.

35. The one-way data transfer system of claim 28, wherein the dedicated feedback node comprises a minimum capacity machine for transferring only the data verification information and no other data to the send node.

36. The one-way data transfer system of claim 28, wherein the communication channel capacity of the dedicated feedback node is user-configurable.

37. The one-way data transfer system of claim 28, wherein the dedicated feedback node is configurable to operate only for predefined time intervals.

38. The one-way data transfer system of claim 28, wherein each of the at least one send node comprises a processor for generating a data verification request to be sent to a selected one of the at least one receive node.

39. The one-way data transfer system of claim 38, wherein the data verification information is generated only after the data verification request is received by the selected receive node.

40. The one-way data transfer system of claim 38, wherein the data verification request is generated at a predefined time interval.

41. The one-way data transfer system of claim 38, wherein the data verification request is generated at a periodic time interval.

42. The one-way data transfer system of claim 38, wherein the data verification request is generated at a random time interval.

43. The one-way data transfer system of claim 28, wherein the data verification information comprises a hash number.

44. The one-way data transfer system of claim 43, wherein the hash number is an MD5 digest or a SHA-1 digest.

45. The one-way data transfer system of claim 28, wherein
each of the at least one send node comprises a processor for applying a hash algorithm to data sent to the central switch to generate a first hash number; and
each of the at least one receive node comprises a processor for applying the hash algorithm to data received from the central switch to generate a second hash number.

46. The one-way data transfer system of claim 45, wherein the dedicated feedback node comprises a processor for generating the data verification information based on the second hash number received from the receive node via the central switch.

47. The one-way data transfer system of claim 46, wherein the send node further comprises a processor for comparing the first hash number with the data verification information received from the dedicated feedback node via the central switch to verify the status of the data that the receive node received from the send node via the central switch.

48. The one-way data transfer system of claim 45, wherein the receive node further comprises a processor for comparing the second hash number with the first hash number received from the send node via the central switch.

49. The one-way data transfer system of claim 48, wherein the receive node further comprises a processor for logging an error if the second hash number does not match the first hash number.

50. The one-way data transfer system of claim 48, wherein the receive node is designed to drop the data received from the send node via the central switch if the second hash number does not match the first hash number.

51. The one-way data transfer system of claim 45, wherein the dedicated feedback node comprises a processor for applying the hash algorithm to the second hash number received from the receive node via the central switch to generate the data verification information.

52. The one-way data transfer system of claim 51, wherein the send node further comprises
a processor for applying the hash algorithm to the first hash number to generate a first double hash number; and
a processor for comparing the first double hash number with the data verification information received from the dedicated feedback node via the central switch to verify the status of the data that the receive node received from the send node via the central switch.

53. The one-way data transfer system of claim 52, wherein the send node further comprises
a processor for calculating expected double hash numbers from known hypothetical error scenarios; and
a processor for comparing the expected double hash numbers with the data verification information to identify an error in the data that the receive node received from the send node via the central switch, if the data verification information does not match the first double hash number.

54. The one-way data transfer system of claim 52, wherein the send node further comprises
a table of expected double hash numbers from known hypothetical error scenarios; and
a processor for comparing the expected double hash numbers with the data verification information to identify an error in the data that the receive node received from the send node via the central switch, if the data verification information does not match the first double hash number.

55. The one-way data transfer system of claim 28, wherein
each of the at least one send node comprises a processor for determining status information of data sent to the central switch; and
each of the at least one receive node comprises a processor for determining status information of data received from the central switch.

56. The one-way data transfer system of claim 55, wherein the receive node further comprises a processor for applying a hash algorithm to the status information of the received data to generate a received data status hash number.

57. The one-way data transfer system of claim 56, wherein the dedicated feedback node comprises a processor for applying the hash algorithm to the received data status hash number received from the receive node via the central switch to generate the data verification information.

58. The one-way data transfer system of claim 57, wherein the send node further comprises:
a processor for applying the hash algorithm to the status information of the sent data to generate a sent data status hash number;
a processor for applying the hash algorithm to the sent data status hash number to generate a sent data status double hash number; and
a processor for comparing the sent data status double hash number with the data verification information received from the dedicated feedback node via the central switch to verify the status of the data that the receive node received from the send node via the central switch.

59. The one-way data transfer system of claim 58, wherein the send node further comprises
a processor for calculating expected double hash numbers from known hypothetical error scenarios; and
a processor for comparing the expected double hash numbers with the data verification information to identify an error in the data that the receive node received from the send node via the central switch, if the data verification information does not match the sent data status double hash number.

60. The one-way data transfer system of claim 58, wherein the send node further comprises
a table of expected double hash numbers from known hypothetical error scenarios; and
a processor for comparing the expected double hash numbers with the data verification information to identify an error in the data that the receive node received from the send node via the central switch, if the data verification information does not match the sent data status double hash number.

61. A method of verifying one-way data transfer from a send node to a receive node across a one-way link, comprising the steps of:
applying a data verification algorithm to data sent from the send node to the one-way link to generate a sent data verification information;
applying the data verification algorithm to data received by the receive node from the one-way link to generate a received data verification information;
sending the received data verification information to the send node over a dedicated feedback one-way link; and
wherein the dedicated feedback node does not transfer message data back to the send node; and
comparing the received data verification information with the sent data verification information to verify the status of the data that the receive node received from the send node via the one-way link.

62. The method of claim 61, wherein
the first applying step comprises the steps of applying a hash algorithm to the data sent from the send node to the one-way link to generate a first hash number and applying the hash algorithm to the first hash number to generate the sent data verification information; and
the second applying step comprises the step of applying the hash algorithm to the data received by the receive node from the one-way link to generate a second hash number and applying the hash algorithm to the second hash number to generate the received data verification information.

63. The method of claim 62, wherein the second applying step further comprises the step of sending the second hash number to a dedicated feedback node over an intermediate one-way link prior to the step of applying the hash algorithm to the second hash number.

64. The method of claim 63, wherein the dedicated feedback node comprises a minimum capacity machine for transferring only the received data verification information and no other data to the send node.

65. The method of claim 63, further comprising the step of configuring the communication channel capacity of the dedicated feedback node.

66. The method of claim 63, further comprising the step of configuring the dedicated feedback node to operate only for predefined time intervals.

67. The method of claim 61, further comprising the step of sending a data verification request to the receive node prior to the second applying step.

68. The method of claim 61, wherein the data verification algorithm is a hash algorithm.

69. The method of claim 68, wherein the hash algorithm is MD5 or SHA-1.

70. The method of claim 62, further comprising the step of comparing the second hash number with the first hash number.

71. The method of claim 70, further comprising the step of logging an error if the second hash number does not match the first hash number.

72. The method of claim 70, further comprising the step of dropping the data received from the send node via the one-way link if the second hash number does not match the first hash number.

73. The method of claim 62, further comprising the steps of:
calculating expected double hash numbers from known hypothetical error scenarios; and
comparing the expected double hash numbers with the received data verification information to identify an error in the data that the receive node received from the send node via the one-way link, if the received data verification information does not match the sent data verification information.

74. The method of claim 62, further comprising the steps of:
generating a table of expected double hash numbers from known hypothetical error scenarios; and
comparing the expected double hash numbers with the received data verification information to identify an error in the data that the receive node received from the send node via the one-way link, if the received data verification information does not match the sent data verification information.

75. The method of claim 61, wherein the first applying step comprises the steps of determining status information of the sent data, applying a hash algorithm to the status information of the sent data to generate a sent data status hash number, and applying the hash algorithm to the sent data status hash number to generate the sent data verification information; and the second applying step comprises the steps of determining status information of the received data, applying the hash algorithm to the status information of the received data to generate a received data status hash number, and applying the hash algorithm to the received data status hash number to generate the received data verification information.

76. The method of claim 75, further comprising the steps of:

calculating expected double hash numbers from known hypothetical error scenarios; and comparing the expected double hash numbers with the received data verification information to identify an error in the data that the receive node received from the send node via the one-way link, if the received data verification information does not match the sent data verification information.

77. The method of claim 75, further comprising the steps of:

generating a table of expected double hash numbers from known hypothetical error scenarios; and comparing the expected double hash numbers with the received data verification information to identify an error in the data that the receive node received from the send node via the one-way link, if the received data verification information does not match the sent data verification information.

* * * * *